Jan. 31, 1967   C. V. BULLEN   3,301,482
RAMP PROGRAM CONTROL SYSTEM
Filed June 16, 1964   2 Sheets-Sheet 1

INVENTOR.
Clark V. Bullen
BY
Wolfe, Hubbard, Voit & Osann
ATTORNEYS

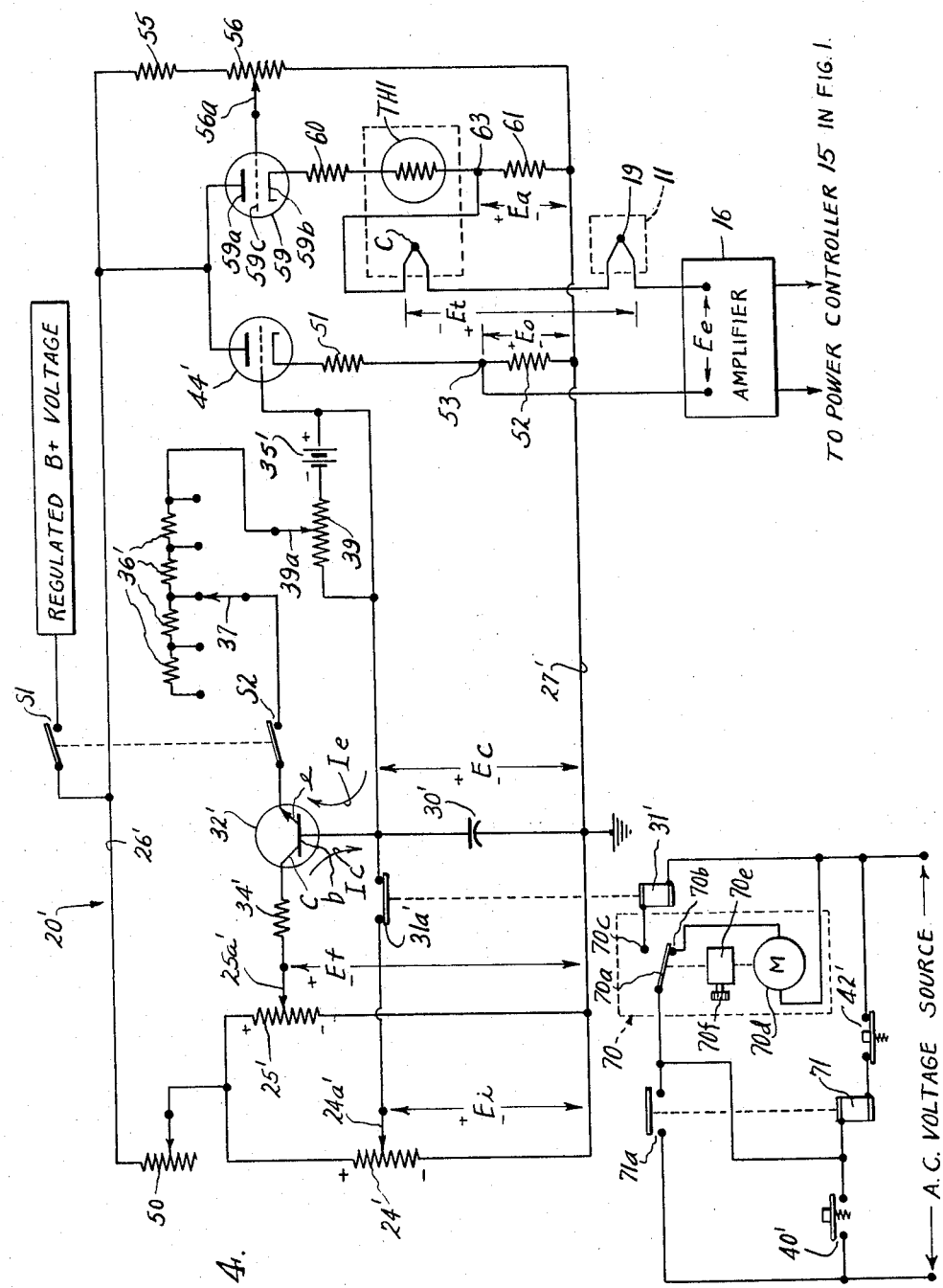

United States Patent Office 3,301,482
Patented Jan. 31, 1967

3,301,482
RAMP PROGRAM CONTROL SYSTEM
Clark V. Bullen, Rockford, Ill., assignor to Barber-Colman Company, Rockford, Ill., a corporation of Illinois
Filed June 16, 1964, Ser. No. 375,530
6 Claims. (Cl. 236—46)

The present invention relates in general to automatic control systems, and in particular to systems for controlling temperatures or other variable conditions according to ramp programs. While not so limited in its uses, the invention is especially advantageously employed in controlling the temperatures of gas chromatography columns, so that such temperatures vary according to any selected one of a wide variety of specific ramp programs.

It is the general aim of the invention to provide a system for controlling a variable condition, such as the temperature of an element, so that it changes from a predetermined initial value at a predetermined rate to a predetermined final value, such system being characterized by its simplicity and economy of organization and construction, and yet also by its reliability and flexibility in operation.

A more specific object of the invention is to provide such a system in which the initial value of the controlled condition is readily adjustable over a wide range, the rate of change of the condition is readily adjustable over a wide range, and the final value of the condition is readily adjustable over a wide range—each such adjustment being independent of the others.

An additional object is to provide such a programmed control system in which the controlled condition is maintained constant for a predetermined period at a selected initial value, thereafter rises at a selected rate, and then remains constant at a selected final value.

It is also an object to provide such a programmed control system in which ambient temperature changes at the cold junction of a temperature-sensing thermocouple are cancelled by a compensating signal which is combined with the ramp program signal in a manner so as to avoid loading of the ramp signal generator.

It is a further object to provide in such a control system an improved ramp signal generator for producing a signal which varies in a manner to represent a program of desired condition values or temperatures, the generator requiring substantially no moving parts for its operation, and yet making possible a range of selected initial signal values, a range of selected rates of rise, and a range of final signal values individually adjustable by the setting of standard adjustable electrical devices, such as potentiometers or rheostats.

Another object is to provide such a ramp signal generator in which the program signal is created by controlling the rate of charging of a capacitor, and in which the ramp or linear rise of the program signal may be made to endure for periods on the order of one hour or more.

Still another object is to precisely control the rate of linear rise of a voltage which appears across a capacitor by adjusting a control current drawn from a very stable voltage source, such as a battery, and to utilize the control current to determine the magnitude of a constant charging current passed from another voltage source to the capacitor.

These and other objects will become apparent as the following description proceeds, taken in conjunction with the accompanying drawings, in which.

Figure 1:
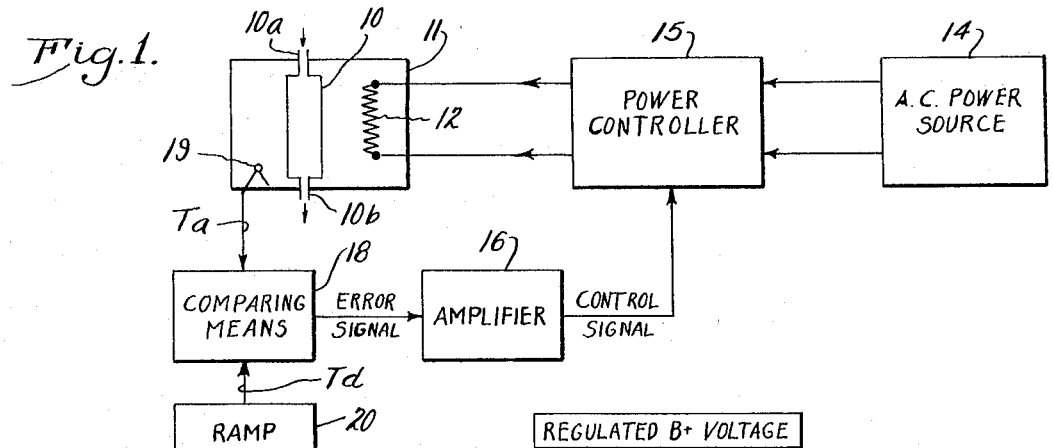
FIGURE 1 is a diagrammatic block and line illustration of the present control system, shown specifically as controlling the temperature of a gas chromatography column.
Figure 3:
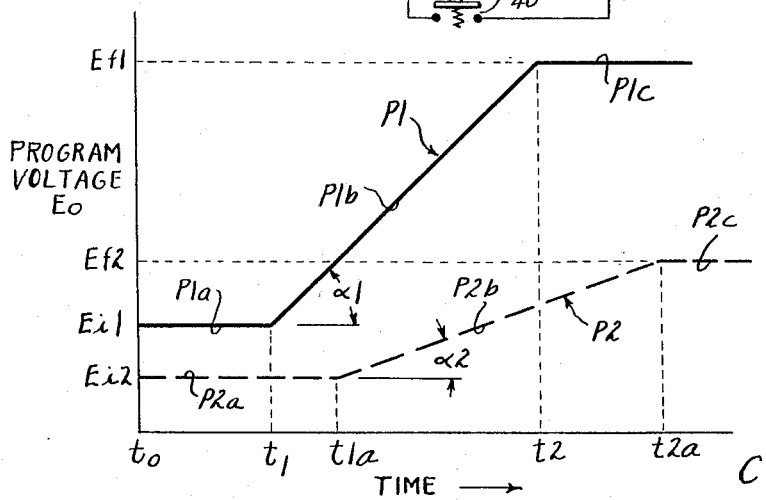

FIG. 3 is a graphic illustration of the manner in which a ramp program signal produced by the ramp generator of FIG. 1 varies with time during two different typical selected programs; and FIG. 4 is a schematic circuit diagram, corresponding to a portion of the system shown in FIG. 1, and illustrating a modified form of the ramp generator, together with the creation and use of a compensating signal.

While the invention has been shown and will be described in some detail with reference to particular embodiments thereof, there is no intention that it thus be limited to such detail. On the contrary, it is intended here to cover all alterations, modifications, and equivalents falling within the spirit and scope of the invention as defined by the appended claims.

Referring now to FIG. 1, the programmed control system is there shown as controlling the temperature of an element which in the exemplary embodiment is a gas chromatography column 10 having an inlet 10a and an outlet 10b. The column is disposed within a jacket 11 containing a column bath which is heated by an electrical resistance type heater 12 receiving current from an A.C. power source 14 through a power controller 15. The controller 15 may take any of a number of specific forms well known to those skilled in the art, and the details thereof needed not be illustrated or described. It will suffice to indicated simply that the controller passes current to the heater 12 in accordance with a control signal received from any suitable type of amplifier 16, the control signal varying in proportion to an error signal applied to the amplifier input. The error signal is produced by a comparing means 18 which receives as its two inputs a first signal $Ta$ representing by its magnitude the actual temperature of the column 10, and a second signal $Td$ representing a desired temperature for the column.

The actual temperature signal $Ta$ is produced by a temperature sensing device here shown as a thermocouple 19 disposed in or adjacent to the column bath, while the desired temperature signal is produced by a ramp generator 20. It will be apparent that the actual temperature signal $Ta$ produced by the thermocouple 19 is in the form of an electrical voltage, and it will become apparent from the description which follows that the desired temperature signal $Td$ is also in the form of an electrical voltage.

Whenever the actual temperature is below or above the desired temperature, i.e., when the first signal $Ta$ is smaller or greater in magnitude than the second signal $Td$, the error signal, produced by the comparing means 18 so as to represent the difference between its two inputs, increases or decreases and the amplifier 16 increases or decreases the control signal applied to the controller 15, so that the latter increases or decreases the current passed through the heater 12 until the temperature error is reduced to zero. In this way the actual temperature of column 10 is automatically controlled and maintained so as to be proportional to the magnitude of the desired temperature signal $Td$. If the desired temperature signal undergoes variations in its magnitude, then the temperature of the column 10 will undergo corresponding variations.

A sample to the analyzed by gas chromatography techniques may contain chemical components falling within a wide range of volatilities. If the low temperature desired for chromatographic separation of highly volatile constituents were maintained, the time required to run the complete chromatographic separation and analysis would be excessively long and the response peaks identifying the low volatility materials would be so shallow and broad that they could not be readily interpreted. In order to shorten the time required and to sharpen the definition of the response peaks, the temperature of the chromatography column is increased with time according to some predetermined temperature program. Heating of the column to an initial value, and thereafter increasing the temperature of the column at a substantially linear rate over periods of up to an hour or so not only shortens the total separation time, but makes the result more useful and meaningful. Such a linear rise in temperature of the column may be followed by another time interval during which the temperature is maintained at a final high level. Accordingly, it is desirable to provide apparatus for automatically causing the temperature of a gas chromatograph column to be maintained initially at a desired low value, to be increased at a linear or constant rate until it reaches a higher final value, and thereafter to be maintained at the final value. Yet, in the practice of chromatography techniques with different columns and for separating different chemical substances into their constituents, it may be necessary for the initial temperature to have any one of a wide range of values, for the linear rise of temperatures to have any one of a wide range of rates or slopes, and for the final temperature to have any of a wide range of values.

In order to so control the column temperature according to a selected ramp program, the ramp generator 20 is provided with means to create, as the desired temperature signal Td, a program signal or voltage which has an adjustable initial value, and which then rises substantially linearly with time at an adjustable or selectable rate until it reaches and remains constant at a final adjustable value. Such a variation in the desired temperature signal Td causes a corresponding variation in the temperature of the column 10, as noted above.

Figure 2:
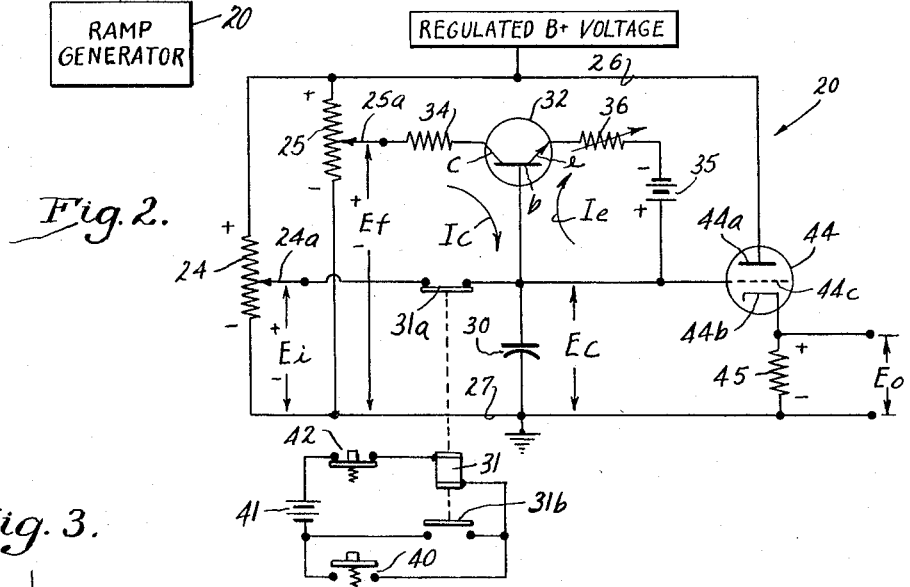
FIG. 2 is a schematic circuit diagram showing the detailed organization of the ramp generator illustrated in FIG. 1.

Referring to FIG. 2, the ramp generator 20 is there shown in detail. It comprises first and second adjustable voltage sources which may take the form of simple, standard, and relatively inexpensive potentiometers 24 and 25 having movable wipers 24a and 25a. These potentiometers are energized by connection across a symbollically shown regulated voltage source connected between a positive conductor 26 and a negative (ground) conductor 27. First and second voltages, which may here be termed initial and final voltages Ei and Ef, appear on the respective wipers 24a and 25a. Simply by manually or automatically setting the wipers 24a and 25a to different positions, these two voltages may be adjusted to any of a wide range of values relative to the value of the regulated B+ voltage. As will become apparent below, the initial voltage Ei will, however, always be adjusted so that it is somewhat less than the final voltage Ef.

For the purpose of creating a voltage which may take on a desired initial value, but thereafter be linearly increased, a capacitor 30 is connected to directly receive the initial voltage Ei. As here shown, the capacitor is connected across the initial voltage Ei through normally closed contacts 31a of a relay 31, the purpose and operation of those contacts being described below. With the contacts 31a closed, as shown, the voltage Ec appearing across the capacitor 30 immediately takes on a value equal to the adjusted value of the initial voltage Ei.

In order that the capacitor voltage Ec may be linearly increased with time at any of a range of rates or slopes, means are employed to supply a charging current of an adjustable but otherwise constant value to the capacitor. In keeping with the present invention, this is accomplished by connecting the output circuit path of a transistor 32 in series with the second voltage source Ef and the capacitor 30. An adjustable control current source is connected in series with the input circuit path of the transistor. As here shown, the transistor 32 (which may be, for example, a planar silicon NPN type 2N698) includes base, emitter, and collector electrodes b, e, and c forming a base-collector junction and a base-emitter junction. The collector c is connected to the wiper 25a through a resistor 34, while the base b is connected to the ungrounded terminal of the capacitor 30, thereby connecting the base-collector junction in series with the capacitor 30 and the second source voltage Ef. The latter voltage thus creates a reverse bias on the base-collector junction.

The current Ic which flows from the wiper 25a through the base-collector junction of the transistor 32 is a direct function of the control current which flows through the base-emitter junction. To give the collector current any one of a wide range of values while nevertheless keeping it constant at a given adjusted value, a source of constant but adjustable control current is connected in series across the base-emitter junction of the transistor. As here shown, such a control current source is constituted by a battery 35 connected in series with a variable resistor or rheostat 36 between the emitter and base terminals of the transistor. The polarity of the battery is such as to impose a forward bias on the base-emitter junction. The use of a battery is advantageous in that it may be of a type which exhibits a very flat or constant output voltage over the range of small currents to be drawn therefrom, and the control current produced by the battery is totally independent of any fluctuation, however minor, which might occur in the regulated B+ supply voltage. Moreover, the use of a separate battery in the emitter circuit of the transistor 32 eliminates any undesired effect on the base-emitter current which might otherwise occur due to changes in currents or voltages in the remainder of the circuit. It will be apparent that simply by adjusting the value of the variable resistor 36, the magnitude of the control current Ie may be varied over a considerable range, and yet that control current will remain almost perfectly constant at any adjusted value. As is well known in the transistor art, the collector-base current Ic which flows through the transistor 32 is a direct function of the emitter curent Ie, especially with a common base connection as here employed. The collector current is not appreciably affected by changes in the transistor temperature, and it is substantially independent of small variations in the voltage which exist across the collector-base junction.

The operation of the ramp generator 20 may now be set forth with reference to the control circuit associated with the relay 31. When the circuit of FIG. 2 is first put into operation and the relay 31 is deenergized so that its contacts 31a are closed, the capacitor voltage Ec immediately takes on the value of the initial voltage Ei. The latter voltage may be set to any desired value by adjustment of the wiper 24a. With the contacts 31a closed, any collector current Ic passed by the transistor 32 cannot charge the capacitor 30, but rather is shunted through the potentiometer 24 to ground. The capacitor voltage Ec will thus remain equal to the initial voltage Ei until such time that the relay contacts 31a open.

As here shown, the relay 31 may be actuated by momentarily closing a start push button switch 40 so as to connect the relay coil in series with a suitable voltage source, here illustrated as a battery 41, through a normally closed reset push button switch 42. When the relay 31 picks up, it is sealed in by its own normally open contacts 31b, and its contacts 31a open. When the contacts 31a open, collector current flowing through the transistor 32 begins to charge the capacitor 30 and the voltage Ec begins to rise. Because the control current Ie in the emitter circuit of the transistor 32 is constant at an adjusted value determined by the setting of the resistor 36, the collector current Ic flowing through the transistor is also substantially constant, and thus the voltage Ec increases at a substantially constant or linear rate with time. The setting of the resistor 36 and the resulting magnitude of the control current Ie determines the magnitude of the collector current Ic, and thus determines the rate or slope at which the capacitor voltage Ec increases.

This linear increase in the capacitor voltage will continue until such time that the capacitor voltage Ec becomes substantially equal to the final voltage Ef. Thereafter, the voltage bias across the collector-base junction of the transistor is substantially zero so that no collector current can flow, and the voltage across the capacitor cannot increase. Thus the final value of the capacitor voltage $Ec$ is determined by the adjusted value of the voltage $Ef$ which is determined by the setting of the wiper 25a.

While it is true that when the voltage $Ec$ is increasing as a result of charging current flowing through the transistor 32, the collector-base junction bias progressively decreases, this does not appreciably affect the magnitude of the collector current, except at the very end of the ramp when the capacitor voltage becomes substantially equal to the final voltage $Ef$. This slight decrease in the rate of rise of the capacitor voltage at the very end of the desired ramp is not a seriously objectionable shortcoming of the device, however, since absolute linearity at the end of a ramp is not essential. It is important, however, that the capacitor 30 have none of its accumulated charge leak off since that would reduce the voltage $Ec$ and destroy the substantially linear rise thereof. For this reason, it is preferable that the capacitor 30 be of a high quality modified Mylar type, and it is also important that the circuitry for utilizing a voltage $Ec$ which appears across the capacitor impose no current drain or load on the capacitor.

In keeping with one aspect of the invention, the voltage $Ec$ appearing across the capacitor is sensed by a very high input impedance amplifier in order to create a final output or program signal $Eo$ which varies faithfully in accordance with the value of the capacitor voltage. As here shown, the voltage $Ec$ is applied to the grid of a vacuum tube 44 connected as a cathode follower amplifier. That is, the anode 44a of the triode 44 is connected directly to the positive conductor 26, and its cathode 44b is connected through a load resistor 45 to the ground conductor 27. The voltage $Ec$ appears between ground and the triode grid 44c. Because in a vacuum tube triode connected as a cathode follower substantially no grid current can flow, there is no leakage path for current to drain off of the capacitor 30. Yet, the voltage $Eo$ appearing across the load resistor 45 varies precisely with changes in the capacitor voltage $Ec$ and directly follows the linear rise of that capacitor voltage when the capacitor is being charged by current flow through the transistor 32.

FIG. 3 by idealized curves P1 and P2 illustrates two typical ramp programs and the variation of the program signal $Eo$ with time, and thus illustrates the high degree of flexibility which is obtainable simply by adjusting the three adjustable devices employed in the ramp generator of FIG. 2. Curve portion P1a indicates that the program voltage $Eo$ may, by appropriate setting of the potentiometer wiper 24a, be given a value of $Ei1$ between time instants $t_0$ and $t_1$. If at time instant $t_1$, the start switch 40 is momentarily actuated, so that the relay 31 is picked up and its contacts 31a opened, then the program voltage $Eo$ begins to rise linearly with a slope $\alpha 1$ (see curve portion P1b). This slope is expressible in volts per minute and is determined by a particular setting of the adjustable resistor 36 which makes the control current $Ie$ have a given constant value and the charging current $Ic$ have a corresponding constant value. When the output or program voltage $Eo$ reaches a particular final value $Ef1$, then it ceases to increase and indeed remains constant as indicated by curve portion P1c. The duration of the time interval between the instant $t_1$ when the ramp rise P1b begins and the instant $t_2$ when the ramp rise terminates depends jointly upon the selected slope $\alpha 1$ and the difference between the selected initial and final voltage $Ei1$ and $Ef1$. For a given differential between the initial and final voltages, the duration of the ramp portion of the program will be shorter or longer as greater or lesser slopes are selected.

Curve P2 is intended to illustrate, by way of comparison with curve P1, a modified ramp program obtained by moving the potentiometer wipers 24a and 25a downwardly to decrease the initial and final voltages $Ei$ and $Ef$, and adjusting the resistor 36 so that it presents a greater effective value, relative to the settings of these adjustable devices which produce the program curve P1. It will be seen from curve portion P2a that the program voltage $Eo$ has a constant but lower initial value $Ei2$ between the instants $t_0$ and $t_{1a}$. Assuming that the start switch 40 is momentarily closed at the instant $t_{1a}$, the output voltage $Eo$ begins to rise linearly at that instant because the contacts 31a are opened, and collector current flow through the transistor 32 begins to charge the capacitor 30 and increase the voltage $Ec$ appearing thereacross. However, because the effective value of the resistor 36 is higher (than in the case of the program curve P1), the control current $Ie$ has a lower constant value, and the charging current $Ic$ has a lower constant value. Accordingly, the voltage $Ec$ and the output voltage $Eo$ rise at a linear rate having a smaller slope $\alpha 2$, as indicated by curve portion P2b. This ramp or slope increase in the output voltage $Eo$ continues until the instant $t_{2a}$, at which time the capacitor voltage $Ec$ has become substantially equal to the lower adjusted value of the final voltage $Ef$. Thereafter the output voltage $Eo$ remains constant at the selected final value $Ef2$, as indicated by curve portion P2c.

It will now be apparent that the ramp generator of FIG. 2 is very flexible in permitting the user to select any one of a wide variety of ramp programs. Simply by adjusting the potentiometer wiper 24a, the value of the initial voltage may be varied over a wide range. Simply by adjusting the resistor 36, the slope or rate of the ramp increase in the program voltage may be changed through a wide range. And simply by adjusting the potentiometer wiper 25a to change the final voltage $Ef$, the final value of the program voltage may be adjusted over a wide range. Yet all three of these adjustments may be made independently of one another.

It will be recalled that the program voltage $Eo$ produced by the ramp generator of FIG. 2 constitutes the desired temperature signal $Td$ supplied, as shown in FIG. 1, to the comparing means 18. As previously explained, therefore, the temperature of the column 10 in FIG. 1 will be caused automatically to follow the changes in the value of the voltage $Eo$ produced by the ramp generator, the column temperature being given a desired but adjustable initial value, then rising at a constant but adjustable slope, and then remaining constant at a higher but adjustable final value. Thus it is feasible in constructing the ramp generator of FIG. 2 when it is to be employed in a system like that of FIG. 1 to calibrate the potentiometers 24 and 25 directly in degrees of temperature, and to calibrate the adjustable resistor 36 in values of slope, e.g., degrees per minute.

Referring next to FIGURE 4, a modified embodiment of the present control system and ramp generator are there illustrated, although all of the components of FIG. 1 have not been included for the sake of brevity. In the form illustrated by FIG. 4, the modified ramp generator 20' is quite similar to that of FIG. 2, and only the differences will be particularly pointed out. It may be noted, first, that the potentiometers 24' and 25' are connected across the regulated voltage supply lines 26', 27' through a variable resistor or rheostat 50, adjustment of the latter thus making possible accurate temperature calibration of dials or scales (not shown) associated with the movable wipers 24a' and 25a'. In lieu of a smoothly variable resistor 36 (FIG. 2) in the emitter circuit of the transistor 32', the embodiment of FIG. 4 employs a series of precision resistors 36' associated with a tap switch 37 so as to effectively connect different values of resistance in series with the voltage source formed by the battery 35' and a potentiometer 39 connected thereacross. By adjusting the wiper 39a to vary the voltage at its wiper the positions of the tap switch may be accurately calibrated in ramp slopes, i.e., degrees per minute. Moreover, a manually actuated switch having normally open contacts S1 and S2 is shown in FIG. 4 for the purpose of disconnecting the B+ voltage source from the conductor 26', and interrupting the emitter-base circuit of the transistor 32'. So long as the switch contacts S1 and S2 are open, the ramp generator 20' is ineffective, and the controlled temperature of the chromatographic column will remain at ambient or room temperature.

Further as shown in FIG. 4, the cathode follower amplifier formed by the triode 44' includes two series connected load resistors 51, 52 having a junction 53 therebetween. The program signal or voltage $Eo$ thus appears across the resistor 52. For the purpose of compensating for the effects of changes in the ambient temperature of the cold junction C for the temperature-sensing thermocouple 19, means are provided to produce a compensating signal indicative of ambient cold junction temperature. As here shown, a voltage divider is connected between the positve and negative voltage supply conductors 26', 27', this voltage divider being formed by the series combination of a resistor 55 and a calibrating potentiometer 56. The wiper 56a of that potentiometer is connected to the control grid 59c of a triode 59, the latter constituting a cathode follower amplifier with its anode 59a connected to the positive voltage conductor 26', and its cathode 59b connected through the series combination of a resistor 60, a thermistor TH1, a junction 63 and a resistor 61 to the grounded conductor 27'. The triodes 44' and 59 together form a differential amplifier, the program voltage $Eo$ appearing across the resistor 52 and a compensating voltage $Ea$ appearing across the resistor 61. As the ambient temperature of the cold junction C, and that of the thermistor TH1 spaced closely to the cold junction, increases or decreases, the resistance of the thermistor TH1 decreases or increases, thereby changing the voltage-dividing ratio of resistors 60, TH1 and 61, thus increasing or decreasing the compensating signal $Ea$. The terminal 53 is connected to one input of the amplifier 16 while the terminal 63 is connected in series through the cold junction C and hot junction 19 to the opposite input terminal of the amplifier. As shown, the thermocouple is poled such that its temperature-representing voltage $Et$ is in series aiding relationship to the compensating voltage $Ea$, and in series opposing relationship to the program voltage $Eo$. Thus, the net error voltage $Ee$ applied as the input signal to the amplifier 16 represents the algebraic sum of the three voltages $Eo$, $Ea$ and $Et$; or more specifically, the error voltage $Ee$ is equal to the difference between (1) the program voltage $Eo$ and (2) the sum of the thermocouple voltage $Et$ and the compensating voltage $Ea$.

As the ambient temperature of the cold junction increases or decreases, the temperature voltage $Et$ will decrease or increase slightly even though the temperature of the jacket 11 remains the same. However, the thermistor TH1, subjected to the same ambient temperature increase or decrease, causes the compensating voltage $Ea$ to increase or decrease. After suitable adjustment of potentiometer wiper 56a to establish the proper value of the voltage $Ea$ at a given ambient temperature, increases or decreases in the voltage $Ea$ will cancel decreases or increases in the voltage $Et$ due to ambient cold junction temperature variations, and the error voltage $Ee$ will represent simply the difference between the desired temperature as represented by the voltage $Eo$ and the actual jacket temperature as sensed by the hot junction 19.

Finally, the embodiment of FIG. 4 includes means for holding the temperature of the controlled element or column 10 (FIG. 1) at the initial selected temperature for a predetermined but adjustable time interval before the ramp or linear increase in temperature begins. For this purpose, the relay 31' is associated with a control circuit which includes an adjustable timer 70. The operation of this control circuit and the timer may best be described by a narrative of the sequence of its operation.

Assume first that a chromatographic separation is to take place in the column 10 shown in FIG. 1. To heat the column 10 to a selected initial and relatively low temperature value, the manual switch contacts S1 and S2 in FIG. 4 are closed, so that the conductor 26' is connected to the regulated B+ supply voltage, and the base-emitter circuit for the transistor 32' is completed. With this, the capacitor 30' will charge immediately to the selected value of the initial voltage $Ei$, and the heater 12 (FIG. 1) will be energized so as to bring the temperature of the column up to a corresponding initial value. Depending upon the thermal leg of the column 10 and its surrounding fluid bath, this may take only a few minutes for the column to reach the desired initial temperature level. Concurrently with the closure of the contacts S1 and S2, therefore, the start switch 40' (FIG. 4) may be momentarily closed so as to energize an auxiliary relay 71, the latter thus closing its contacts 71a and being sealed in through a normally closed reset switch 42'. Closure of the contacts 71a also completes an energizing circuit through timer contacts 70a, 70b to energize a time motor 70d so that the latter drives a presettable mechanism 70e which operates to actuate the switch arm 70a after a predetermined, but adjustable time interval. When this occurs contacts 70a, b open and contacts 70a, 70c close so that the relay 31' is energized to open its contacts 31a', thereby initiating the linear rise or ramp increase of the capacitor voltage $Ec$. The temperature of the controlled element or column 10 rises linearly, as previously explained. By providing a suitable timer 70, which may be of any suitable commercially available construction, it is thus possible to cause the selected initial temperature to be maintained for a predetermined and selected time interval prior to the start of the ramp. A knob or dial 70f associated with the timer 70 may be adjusted to select the length of this initial time interval.

From the foregoing, it will now be clear that the present ramp program system is one which indeed involves substantially no moving parts, and yet which permits infinitely small or smooth adjustments in the desired initial value, the desired slope, and the desired final value of the controlled variable.

I claim as my invention:

1. In a system for controlling a variable condition according to an adjustable ramp program, the combination comprising a capacitor, a first adjustable voltage source connected across said capacitor, a second adjustable voltage source, a transistor having its output circuit connected in series with said capacitor and said second voltage source, an adjustable control current source connected in series with the input circuit of said transistor, means for disconnecting said first voltage source from said capacitor so that output current through said tranistor causes the voltage across said capacitor to rise linearly at a rate determined by the setting of said current source from an initial value equal to the voltage of said first source to a final value substantially equal to the voltage of the second source, a high input impedance amplifier connected to receive as its input signal the voltage across said capacitor and to produce a corresponding output voltage, means for producing a voltage representative of the actual value of the variable condition, and means responsive to said output voltage and said representative voltage for controlling the variable condition in a manner to keep the variable condition substantially proportional to the output voltage.

2. In a system for controlling the temperature of an element according to an adjustable ramp program, the combination comprising first and second potentiometers adapted to be energized from a voltage source and to produce adjustable initial and final voltages with the latter being greater than the former, a capacitor connected directly to receive said initial voltage, a transistor having a collector-base junction connected in series with said final voltage and said capacitor, said transistor having an emitter-base junction, an adjustable resistor and a battery connected in series with said emitter-base junction to provide an adjustable control current therethrough, means for disconnecting said initial voltage from said capacitor to initiate charging of said capacitor by current flow through said collector-base junction, a thermocouple for producing a temperature voltage generally proportional to the actual temperature of said element, means for producing a compensating voltage representative of the ambient cold junction temperature of said thermocouple, means for producing an error signal representative of the algebraic sum of (a) the voltage across said capacitor (b) said temperature voltage and (c) said compensating voltage, and means responsive to said error signal for supplying heat energy to said element to keep its temperature substantially proportional to the value of the voltage across said capacitor.

3. In a system for controlling the temperature of an element according to an adjustable ramp program, the combination comprising means for producing adjustable initial and final voltages with the latter being greater than the former, a capacitor connected directly across said initial voltage, a transistor having a collector-base junction connected in series with said capacitor across said final voltage, said transistor having an emitter-base junction, a battery and an adjustable resistor connected in series with said emitter-base junction, a high input impedance amplifier connected to receive the voltage across said capacitor and to produce an output voltage corresponding thereto, means responsive to said output voltage for keeping the temperature of the element substantially proportional thereto, means for initiating operation of said voltage producing means, and timer means for disconnecting said capacitor from said initial voltage after a predetermined interval from the actuation thereof, whereby the element temperature is held constant at a value determined by the adjusted value of said initial voltage during said interval and thereafter increases linearly at a rate determined by the adjustment of said adjustable resistor until it reaches a final value determined by the adjusted value of said final voltage.

4. For use in a programmed control system, a ramp signal generator comprising the combination of a capacitor, a first adjustable voltage source and means for charging said capacitor to the voltage thereof, a second adjustable voltage source, a transistor having its output circuit connected in series with said capacitor and said second voltage source, an adjustable control current source connected in series with the input circuit of said transistor, and means for disconnecting said first voltage source from said capacitor so that output current through said transistor causes the voltage across said capacitor to rise linearly with time from the adjusted value of said first voltage source at a rate determined by adjustment of said current source until it reaches the adjusted value of the second voltage source.

5. For use in a programmed control system, a ramp signal generator comprising the combination of a capacitor, a first potentiometer for producing an adjustable first voltage across said capacitor, a second potentiometer for providing a second adjustable voltage which is greater than the first voltage, a transistor having an output circuit and an input circuit, said output circuit being connected in series with said capacitor and said second voltage, a battery and a rheostat connected in series with said input circuit to produce an adjustable control current through the latter, and means for disconnecting said first voltage from said capacitor, whereby the voltage across said capacitor thereafter rises linearly from the adjusted first voltage value at a rate determined by the setting of said rheostat until it reaches and remains at the adjusted second voltage value.

6. For use in a programmed control system, a ramp signal generator comprising in combination a first potentiometer adapted to be energized from a voltage source and having an adjustable first wiper on which appears an adjustable first voltage, a capacitor connected directly to receive said first voltage, a transistor having a collector-base junction and an emitter-base junction, a second potentiometer adapted to be energized from said voltage source and having an adjustable second wiper on which appears an adjustable second voltage, means connecting said collector-base junction in series with said capacitor and said second voltage, a battery and an adjustable resistor connected in series with said emitter-base junction to supply an adjustable control current therethrough, a vacuum tube cathode follower amplifier connected to receive as its input the voltage across said capacitor, and means for disconnecting said first voltage from said capacitor to initiate a linear rise of the capacitor voltage and the output of said amplifier at a rate determined by the setting of said adjustable resistor to a value determined by the setting of said second wiper.

References Cited by the Examiner

UNITED STATES PATENTS

| | | | |
|---|---|---|---|
| 2,250,899 | 7/1941 | Young | 236—46 |
| 2,376,488 | 5/1945 | Jones | 236—68 |
| 2,505,688 | 4/1950 | Picking | 320—1 |
| 2,591,053 | 4/1952 | Boisblanc | 320—1 X |
| 2,953,734 | 9/1960 | Leyde et al. | 320—1 |
| 3,088,064 | 4/1963 | Anger. | |

ALDEN D. STEWART, *Primary Examiner.*